(12) United States Patent
Won et al.

(10) Patent No.: US 9,059,599 B2
(45) Date of Patent: Jun. 16, 2015

(54) METHOD AND SYSTEM FOR MULTI WIRELESS CHARGING

(75) Inventors: Yun Jae Won, Yongin-si (KR); Seung Ok Lim, Seongnam-si (KR); Yeon Kug Moon, Seongnam-si (KR); Yong Seok Lim, Seoul (KR); Young Han Kim, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 382 days.

(21) Appl. No.: 13/454,690

(22) Filed: Apr. 24, 2012

(65) Prior Publication Data

US 2013/0278206 A1 Oct. 24, 2013

(30) Foreign Application Priority Data

Apr. 20, 2012 (KR) ........................ 10-2012-0041334

(51) Int. Cl.
 *H02J 7/00* (2006.01)
 *H02J 7/02* (2006.01)
 *H02J 17/00* (2006.01)

(52) U.S. Cl.
 CPC ......... *H02J 7/025* (2013.01); *H02J 2007/0096* (2013.01); *H02J 2007/0098* (2013.01); *H02J 17/00* (2013.01)

(58) Field of Classification Search
 CPC .............. H02J 7/025; H02J 2007/0096; H02J 2007/0098
 USPC ........................................................ 320/108
 See application file for complete search history.

(56) References Cited

U.S. PATENT DOCUMENTS

| | | | | |
|---|---|---|---|---|
| 7,375,492 B2* | 5/2008 | Calhoon et al. | ............... | 320/108 |
| 7,375,493 B2* | 5/2008 | Calhoon et al. | ............... | 320/108 |
| 8,174,232 B2* | 5/2012 | Jee | ................ | 320/108 |
| 8,198,858 B2* | 6/2012 | Kim et al. | ...................... | 320/108 |
| 8,217,621 B2* | 7/2012 | Tsai et al. | ..................... | 320/108 |
| 8,269,654 B2* | 9/2012 | Jones | ........................... | 340/907 |
| 8,378,817 B2* | 2/2013 | Fox | ............................ | 340/540 |
| 8,452,235 B2* | 5/2013 | Kirby et al. | .................. | 455/41.1 |
| 8,502,497 B2* | 8/2013 | Pijnenburg et al. | ........... | 320/108 |
| 8,575,890 B2* | 11/2013 | Hwang | ........................ | 320/103 |
| 2005/0127867 A1* | 6/2005 | Calhoon et al. | ............... | 320/108 |
| 2005/0127868 A1* | 6/2005 | Calhoon et al. | ............... | 320/108 |
| 2005/0127869 A1* | 6/2005 | Calhoon et al. | ............... | 320/108 |
| 2009/0128086 A1* | 5/2009 | Lee | ................. | 320/101 |
| 2009/0140692 A1* | 6/2009 | Hwang | ........................ | 320/108 |
| 2010/0017249 A1* | 1/2010 | Fincham et al. | .................. | 705/8 |
| 2010/0181961 A1* | 7/2010 | Novak et al. | .................. | 320/108 |
| 2010/0213895 A1* | 8/2010 | Keating et al. | ................ | 320/108 |
| 2010/0228272 A1* | 9/2010 | Balbierz et al. | ............... | 606/153 |
| 2011/0218014 A1* | 9/2011 | Abu-Qahouq | ................ | 455/522 |

(Continued)

OTHER PUBLICATIONS

Cannon, Benjamin L., et al., "Magnetic Resonant Coupling as a potential means for wireless power transfer to multiple small receivers", 2009. IEEE, IEEE transactions on power electronics, vol. 24, No. 7, Jul. 2009. pp. 1-8 (1819-1825).*

*Primary Examiner* — Stacy Whitmore
(74) *Attorney, Agent, or Firm* — Sughrue Mion, PLLC (57) ABSTRACT

A wireless multi charging method and system are disclosed. The wireless charging method selects a portion of mobile devices located in a charging region as a group, and provides energy for wireless charging to the selected group of mobile devices. Accordingly, group charging is possible, and thus it is also possible to selectively charge mobile devices which allow charging.

8 Claims, 8 Drawing Sheets

(56) References Cited

U.S. PATENT DOCUMENTS

| | | | |
|---|---|---|---|
| 2011/0279244 A1* | 11/2011 | Park et al. | 340/10.34 |
| 2012/0153893 A1* | 6/2012 | Schatz et al. | 320/108 |
| 2012/0187851 A1* | 7/2012 | Huggins et al. | 315/159 |
| 2012/0326660 A1* | 12/2012 | Lu et al. | 320/108 |
| 2013/0088192 A1* | 4/2013 | Eaton | 320/108 |
| 2013/0169220 A1* | 7/2013 | Karner et al. | 320/108 |
| 2013/0257365 A1* | 10/2013 | Redding | 320/108 |
| 2013/0278206 A1* | 10/2013 | Won et al. | 320/108 |
| 2014/0159652 A1* | 6/2014 | Hall et al. | 320/108 |

* cited by examiner

METHOD AND SYSTEM FOR MULTI WIRELESS CHARGING

CROSS-REFERENCE TO RELATED APPLICATIONS

This application claims priority from Korean Patent Application No. 10-2012-0041334, filed in the Korean Intellectual Property Office on Apr. 20, 2012, the disclosure of which is incorporated herein by reference.

BACKGROUND OF THE INVENTION

1. Field of the Invention

Methods and apparatuses consistent with the exemplary embodiments relate to a method and system for wireless charging, and more specifically to a method for receiving energy wirelessly and charging the received energy, and a charging system which operates the method efficiently.

2. Description of the Prior Art

Wireless charging which is also referred to as contactless charging has a principle that one charging base station must charge one mobile device. This is because of the low efficiency of wireless charging and the interruption which may occur among a plurality of mobile devices.

Charging a plurality of mobile devices together is useful since it reduces the charging time, thereby providing prompt charging service to a plurality of users.

Therefore, there is need for a method which could increase the charging efficiency in the case of charging a plurality of mobile devices at the same time, and also a method which could prevent unwanted charging of a mobile device. That is, there is need for a method which could limit charging an unauthorized mobile device or charging a mobile device which does not need to be charged urgently.

SUMMARY OF THE INVENTION

An aspect of the exemplary embodiments relates to a wireless charging method and system which select a portion of mobile devices located in a charging region as a group and charge it.

A wireless charging method, according to an exemplary embodiment, may include selecting a portion of mobile devices located in a charging region as a group, and providing energy intended to wirelessly charge the mobile devices in the group to the mobile devices in the group.

In addition, the providing may provide magnetic field energy to a frequency band including resonant frequencies of the mobile devices of the group.

In addition, the selecting may include selecting a portion of the mobile devices as a first group, and selecting the other portion of the mobile devices as a second group, and the providing may provide energy intended to wirelessly charge the mobile devices in the first group and energy intended to wirelessly charge the mobile devices in the second group in a time division method.

In addition, the wireless charging method may further include granting a charging order of priority to the mobile devices located in the charging region, and providing energy to the mobile devices, according to the granted charging order of priority.

In addition, the charging order of priority may be determined considering at least one of type, state of battery charge, remaining battery time and distance to the charging base station.

In addition, the wireless charging method may further include selecting a portion of the mobile devices located in the charging region as energy relays which relay magnetic field energy wirelessly.

In addition, the selecting may select a portion of the mobile devices as the energy relays, considering locations and states of battery charge of the mobile devices.

Meanwhile, a wireless charging system, according to an exemplary embodiment, may include mobile devices, and a charging device which selects a portion of mobile devices located in a charging region as a group, and provides energy intended to wirelessly charge the mobile devices in the group to the mobile devices of the group.

As aforementioned, according to the present disclosure, group charging becomes possible, thereby allowing selectively charging mobile devices that allow charging. In addition, since the communication region performs a preparation procedure for charging in advance, it is possible to promptly and effectively operate the charging procedure.

Not only that, since it is possible to select an appropriate mobile device and operate it as an energy relay, it is unnecessary to install an additional energy relay. Furthermore, it becomes possible to operate a plurality of charging base stations, thereby enabling more effective wireless charging.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

1. Operating Charging/Communication Region

Figure 1:
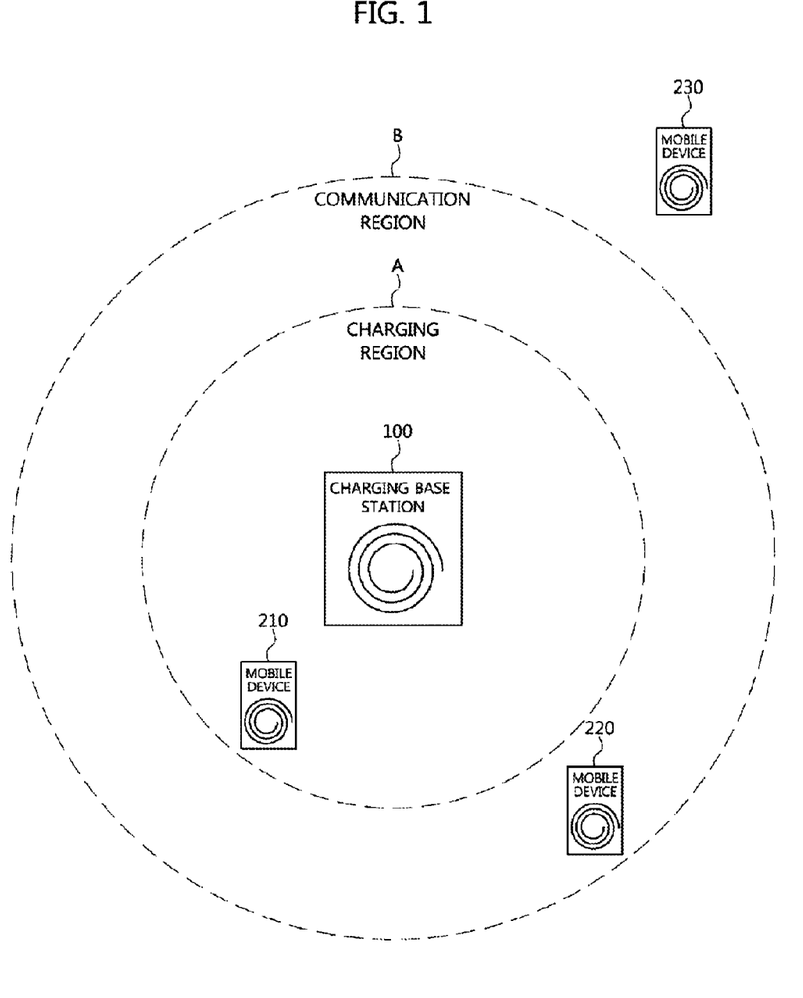
FIG. 1 is a view explaining a concept of a charging region and a communication region.

FIG. 1 is a view explaining a concept of a charging region and a communication region. FIG. 1 illustrates one charging base station 100 and a plurality of mobile devices 210, 220, 230. In addition, surrounding area of the charging base station 100 is divided into charging region A and communication region B.

Charging region A is a region where energy may be transmitted wirelessly from the charging base station 100 in a magnetic resonance inducement method and be charged with the transmitted energy. Communication region B is a region where magnetic field communication is possible with the charging base station 100.

Since charging region A is located inside communication region B, magnetic field communication with the charging base station 100 is obviously possible in charging region A as well.

In a case where the charging base station 100 and the plurality of mobile devices 210, 220, 230 are located as illustrated in FIG. 1, i) since mobile device-3 (230) is located outside communication region B, not only is communicating with the charging base station 100 impossible, but it is also impossible to be charged with energy transmitted from the charging base station 100, ii) since mobile device-2 (220) is located inside communication region B, only magnetic field communication is possible with the charging base station 100, and iii) since mobile device-1 (210) is located inside charging region A, not only is it possible to receive energy wirelessly from the charging base station 100 in a magnetic resonance inducement method and be charged with the received energy, but magnetic field communication with the charging base station 100 is also possible.

Figure 2:
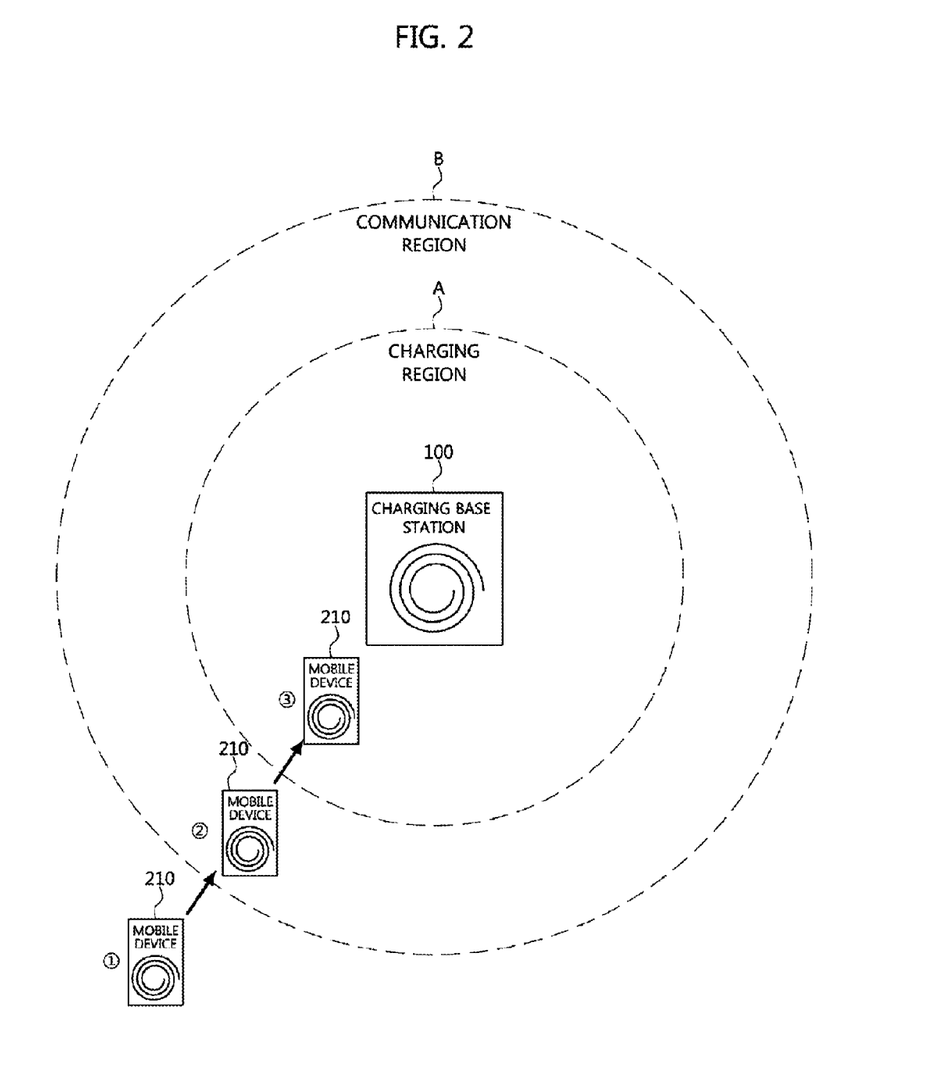
FIG. 2 is a view explaining operating state changes of a mobile device which occur when the mobile device moves.

FIG. 2 is a view explaining operating state changes of mobile device-1 (210) which occur when the mobile device moves. FIG. 2 illustrates a state where mobile device-1 (210) moves from outside of communication region B (①) to inside of communication region B (②), and then to inside of charging region A (③).

Since in a case where mobile device-1 (210) is located outside of communication region B, it is impossible for mobile device-1 (210) to make magnetic field communication with the charging base station 100, and thus mobile device-1 (210) cannot recognize the existence of the charging base station 100.

However, when mobile device-1 (210) moves inside of communication region B (②), since it is possible for mobile device-1 (210) to make magnetic field communication with the charging base station 100, mobile device-1 (210) recognizes the existence of the charging base station 100.

When making magnetic field communication with the charging base station 100 becomes possible, mobile device-1 (210) may perform advanced preparation procedure for charging. The charging preparation procedure is as follows: 1) mobile device-1 (210) transmits its ID to the charging base station 100, and 2) the charging base station 100 determines whether or not to allow charging, based on the transmitted ID.

More specifically, if the transmitted ID is an ID for which charging is allowed, the charging base station 100 allows charging mobile device-1 (210), whereas if the transmitted ID is an ID for which charging is not allowed, the charging base station 100 does not allow charging mobile device-1 (210).

Meanwhile, the present disclosure may be embodied in such a manner that, in the charging preparation procedure, mobile device-1 (210) further transmits information on a state of battery charge besides its ID, in which case the charging base station 100 would not to allow charging mobile device-1 (210) in a case where the state of battery charge is good even if the ID is one for which charging is allowed.

Meanwhile, the present disclosure may also be embodied in such a manner that, in the charging preparation procedure, mobile device-1 (210) transmits information on its device type and remaining battery time to the charging base station 100, and the charging base station 100 determines whether or not to charge mobile device-1 (210) based thereon.

In addition, even when charging is allowed, charging may be allowed in various diffident charging levels. For example, it is possible to allocate much energy and energy provision time to a mobile device of a premium ID, while allocating less energy and energy provision time to a mobile device of a general ID.

Furthermore, it is also possible to allocate energy amount and energy provision time based on the type or remaining battery time of a mobile device.

When mobile device-1 (210) for which charging is allowed moves inside the charging region A (③), mobile device-1 (210) wirelessly receives energy provided from the charging base station 100 and charges its battery.

Figure 3:
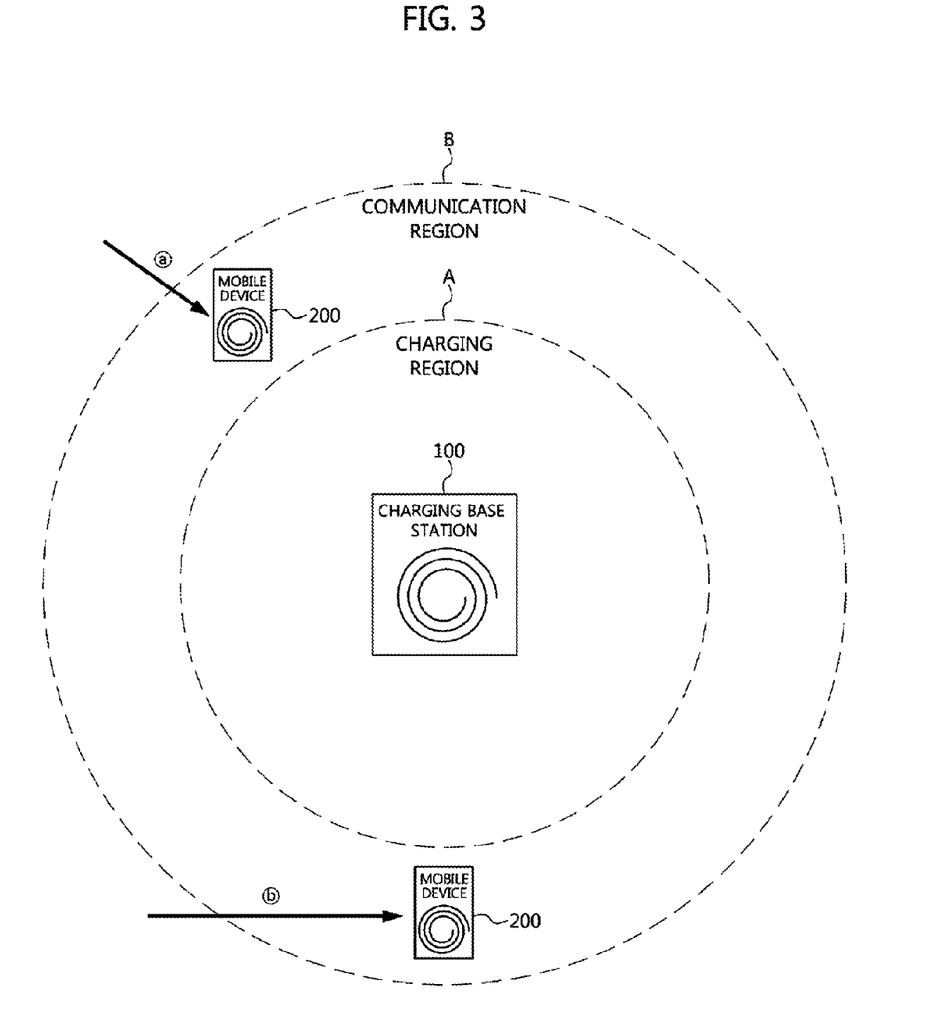
FIG. 3 is a view providing additional explanations on a charging preparation procedure of a mobile device.

Meanwhile, even if the mobile device entered inside the communication region B, the mobile device may not perform a charging preparation procedure. For example, as illustrated in FIG. 3, the present disclosure may be embodied in such a manner that, in a case where a movement trace is not towards a direction of the charging region A (ⓑ), the charging preparation procedure is not performed even if the mobile device 200 recognizes the charging base station 100.

This is because a mobile device of which a movement trace is not towards a direction of the charging region A need not be regarded as a mobile device which has intentions to be charged (that is, as a mobile device which approaches the charging base station 100 to be charged), thereby preventing an unnecessary charging preparation procedure in the corresponding mobile device.

Meanwhile, in order to prevent an unnecessary charging preparation procedure, it is also possible to embody the present disclosure in such a manner that a mobile device performs a charging preparation procedure after a certain time has passed even when the mobile device entered inside communication region B. Herein, it is possible to embody the certain time to be set adaptively according to the type and state of battery charge.

2. Multi Charging Method

A multi charging method refers to charging a plurality of mobile devices located in a charging region altogether. Not only charging a plurality of mobile devices located in a charging region (hereinafter referred to as 'all charging') but also charging only a portion of the mobile devices in groups (hereinafter referred to as 'group charging') is included in the range of the multi charging method.

For multi charging, the charging base station 100 adjusts a frequency band of a magnetic field. In a case of an all charging, the charging base station 100 provides magnetic field energy to a frequency band which includes resonant frequencies of all mobile devices for which charging is allowed.

In a case of a group charging, the charging base station 100 provides magnetic field energy to a frequency band which includes resonant frequencies of mobile devices that belong to that group.

Figure 4:
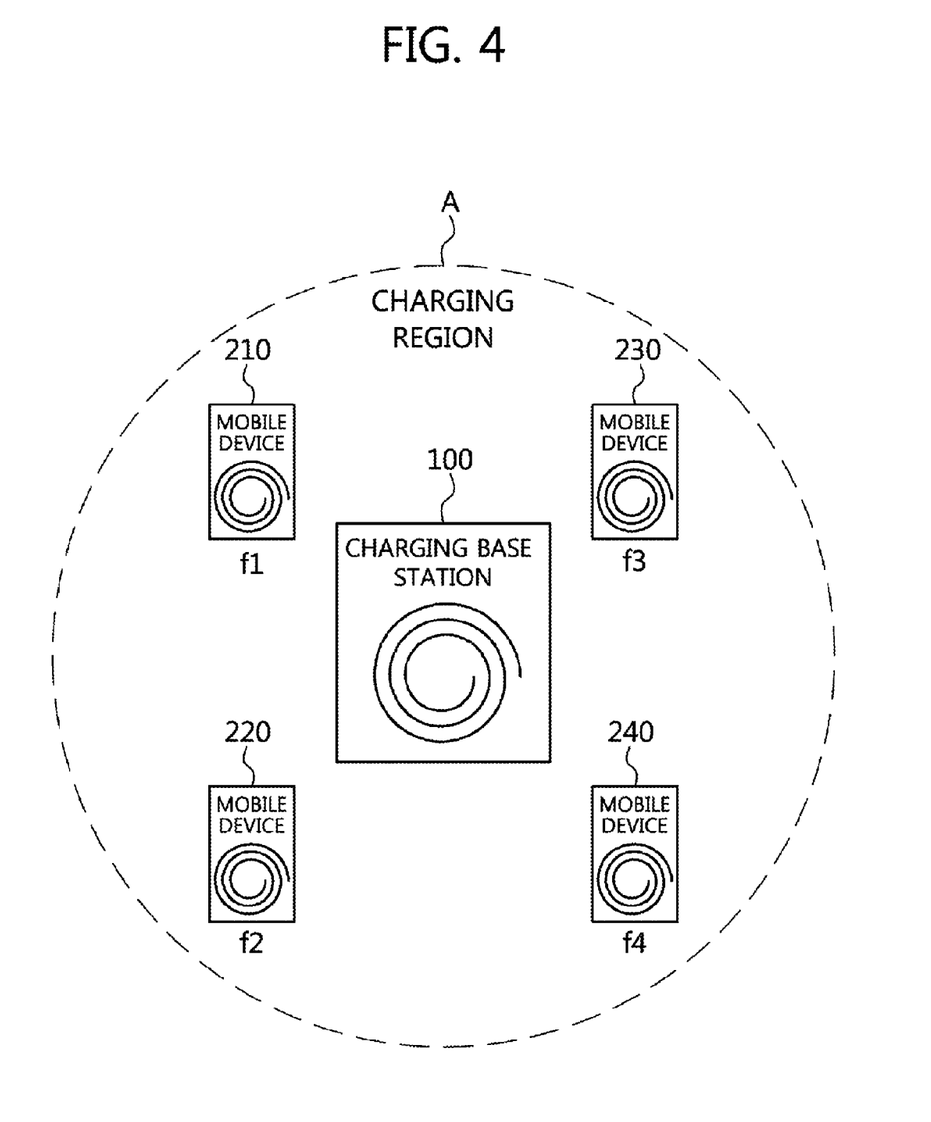
FIG. 4 is a view explaining a multi charging.

FIG. 4 is based on an assumption that 4 mobile devices 210, 220, 230, 240 are located inside charging region A, and their resonant frequencies are $f_1$, $f_2$, $f_3$, and $f_4$, respectively.

Herein, in a case of charging all the mobile devices, the charging base station 100 provides magnetic field energy to frequency band $B_{1-4}$ which includes all the $f_1$, $f_2$, $f_3$, and $f_4$. Meanwhile, in a case of group charging only mobile devices-1, 2, 3 (210, 220, 230), the charging base station 100 provides magnetic field energy to frequency band $B_{1-3}$ which includes only $f_1$, $f_2$, and $f_3$.

Figure 5:
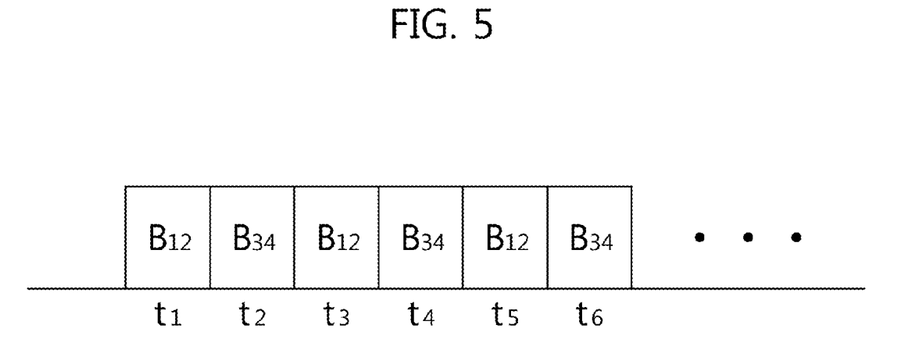
FIG. 5 is a view explaining a charging method where a time division charging method has been added.

Meanwhile, in order to increase the charging efficiency, a time division method may be further applied to the multi charging method. That is, as illustrated in FIG. 5, it is possible to provide magnetic field energy to frequency band $B_{12}$ to group charge mobile devices-1, 2 (210, 220) for section $t_1, t_3, t_5, \ldots$, provide magnetic field energy to frequency band $B_{34}$ to group charge mobile devices-3, 4 (230, 240) for section $t_2, t_4, t_6$.

Meanwhile, it is possible to perform multi charging based on an order of priority. That is, it is possible to grant an order of priority to mobile devices 210, 220, 230, 240, and charge them one by one or in groups according to the charging order of priority. The charging order of priority may be determined in consideration of the type, state of battery charge, and remaining battery time of the mobile devices 210, 220, 230, 240. Not only that, it is possible to further apply a time division charging method to the multi charging method which is based on the order of priority.

3. Multi Charging Relay

It is possible to operate some of the mobile devices located near the charging base station 100 to function as energy relays which wirelessly relay magnetic field energy. An energy relay is a device which transmits magnetic field energy wirelessly received from the charging base station 100 to another mobile device nearby, and thus expands the wireless approaching range of the magnetic field energy. A mobile device located outside charging region A may also be charged by the energy relay.

The mobile devices to function as energy relays of among a plurality of the mobile devices located nearby are selected by the charging base station 100. A mobile device selected as an energy relay does not transmit magnetic field energy wirelessly received from the charging base station 100 to load, but reflects it and then relays it to another mobile device nearby.

Figure 6:
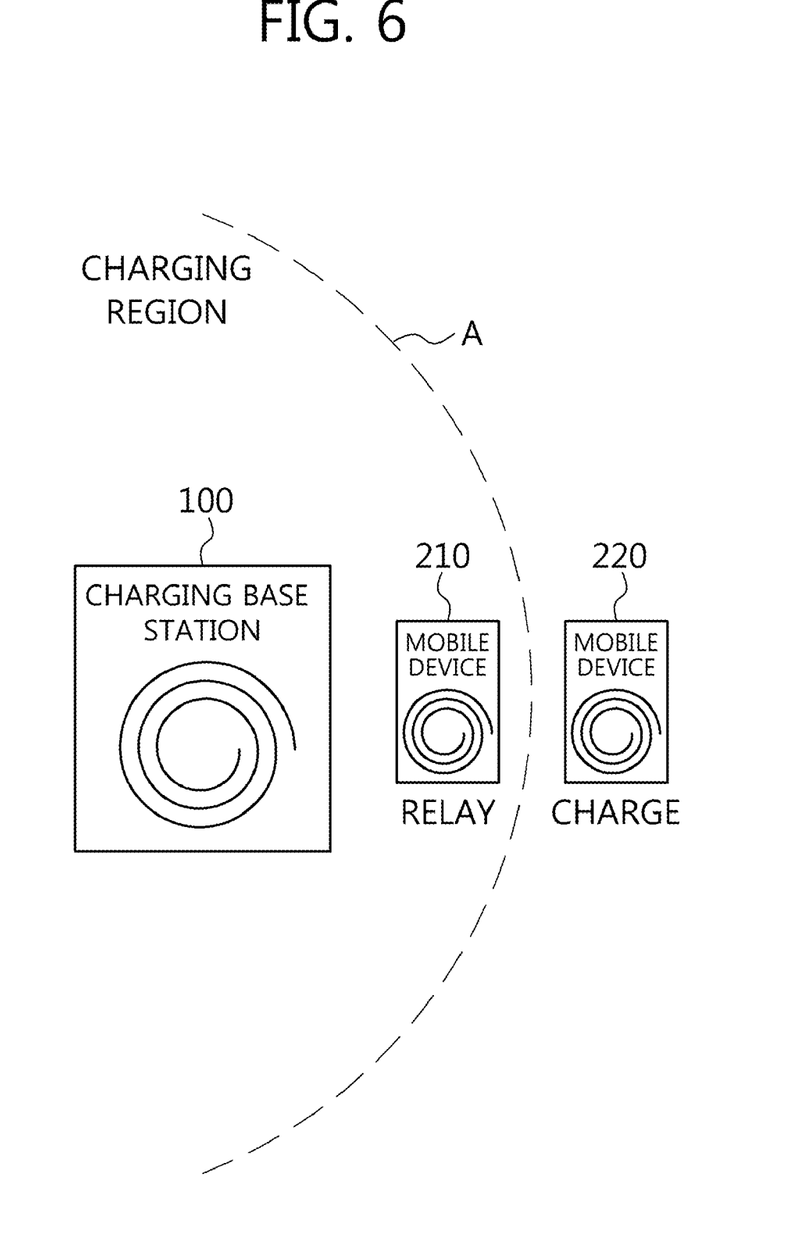
FIGS. 6 and 7 are views explaining a method for selecting an energy relay.

The charging base station 100 selects an energy relay based on a distance/location of the mobile devices. More specifically, as illustrated in FIG. 6, the charging base station 100 may select mobile device-1 (210) located near it as an energy relay, and enable mobile device-2 (220) located outside charging region A to be charged.

Figure 7:
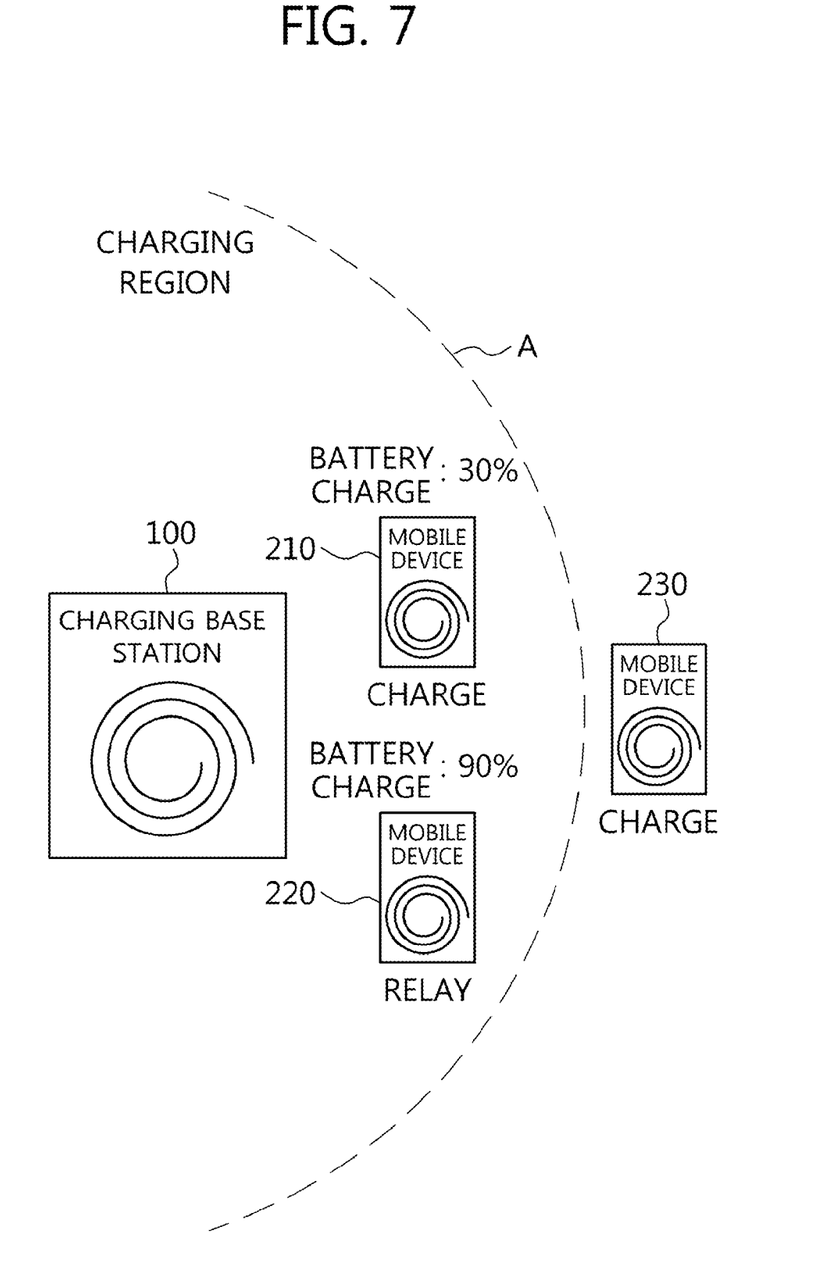

Meanwhile, the charging base station 100 may select a mobile device of which a state of battery charge is good as an energy relay. For example, as illustrated in FIG. 7, the charging base station 100 may select mobile device-2 (220) which has a better state of battery charge of among the mobile devices 210, 220 located near it as an energy relay, and may enable mobile device-3 (230) located outside charging region A to be charged.

Meanwhile, it is possible for a mobile device selected as an energy relay to perform both the charging and energy relaying. For example, a mobile device may use some of received energy to charge itself, and relay the rest of the energy to another mobile device.

4. Multi Charging Base Station

In the charging system explained so far, there was only one charging base station. However, it is also possible to embody the charging base station to be more than one, as illustrated in FIG. 8.

Figure 8:
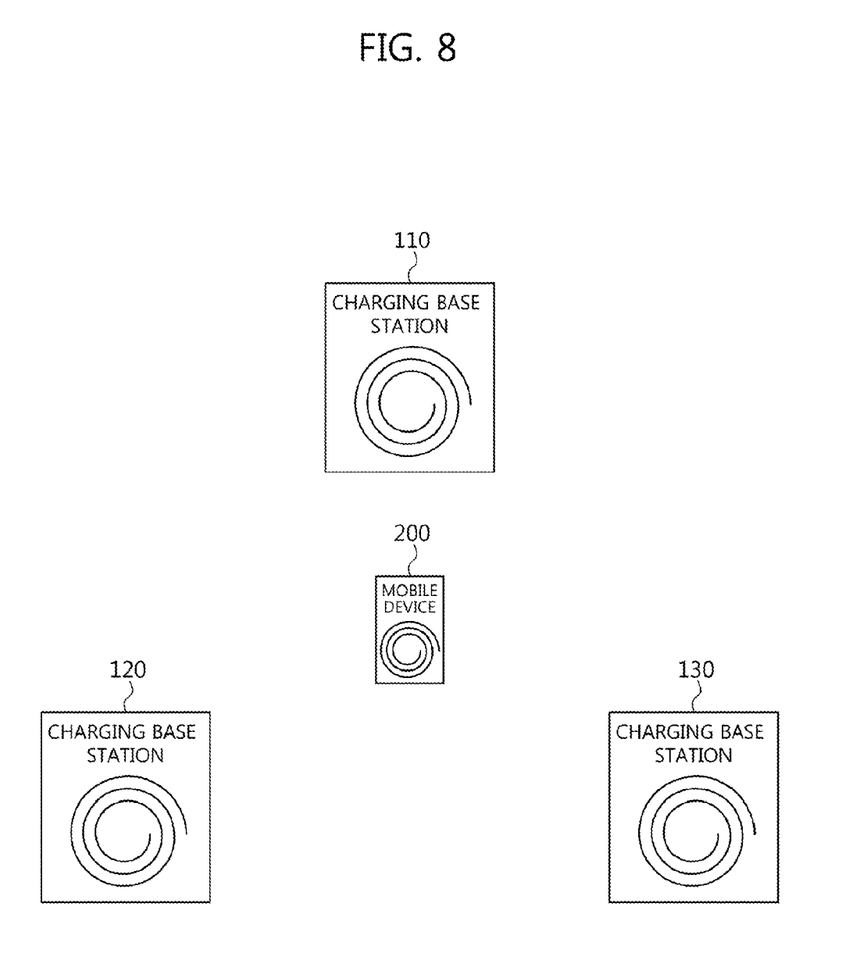
FIG. 8 is a view illustrating a charging system of a multi charging base station environment.

According to FIG. 8, there are 3 charging base stations 110, 120, 130 near the mobile device 200. The mobile device 200 may select one of the charging base stations 110, 120, 130, and receive magnetic field energy wirelessly from the selected charging base station, and charge its battery.

Selecting a charging base station may be possible manually by a user of the mobile device 200. That is, a list created by scanning the charging base stations 110, 120, 130 located near the mobile device 200 may be displayed so that the user can select a charging base station.

The charging base stations in the list need not be limited to the charging base stations located in the charging region. Charging base stations located in the communication region may be listed as a candidate group.

Other than a manual selection by a user, the mobile device 200 may be embodied to automatically select a charging base station. For example, it is possible for the mobile device 200 to automatically select a charging base station of which the strength of the magnetic field energy received wirelessly is the greatest of among the scanned charging base stations 110, 120, 130, and to receive the magnetic field energy from the selected charging base station and use it.

Besides the above, it is possible for the mobile device 200 to calculate distances from itself to the charging base stations 110, 120, 130, and select the charging base station located the nearest.

Otherwise, it is also possible for the mobile device 200 to be connected to the charging base stations 110, 120, 130, receive information on the number of mobile devices being charged, and select a charging base station based on that information. For example, in a case where 2 mobile devices are receiving magnetic field energy from charging base station-1 (110) and are being charged, 3 mobile devices are receiving magnetic field energy from charging base station-2 (120) and are being charged, and 1 mobile device is receiving magnetic field energy from charging base station-3 (130) and is being charged, the mobile device 200 may select charging base station-3 (130) as the charging base station from which to receive energy.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A wireless charging method comprising:
   selecting a portion of mobile devices located in a charging region as a group based on identification information transmitted from the mobile devices upon entering a communication region outside the charging region;
   selecting a portion of the mobile devices as a first group;
   selecting another portion of the mobile devices as a second group
   determining to allow allocation of energy to the mobile devices in the group;
   determining to deny allocation of energy to other mobile devices not selected as belonging to the group;
   determining an allocation amount and provision time of energy to the mobile devices in the group based on the identification information;
   providing energy intended to wirelessly charge the mobile devices in the group to the mobile devices in the group according to the determined allocation amount and provision time; and
   selecting a portion of the mobile devices located in the charging region as energy relays which relay magnetic field energy wirelessly,
   wherein the identification information comprises membership information to a predetermined group for which charging is allowed, and
   wherein the providing provides energy intended to wirelessly charge the mobile devices in the first group and energy intended to wirelessly charge the mobile devices in the second group in a time division method.

2. The method according to claim 1, wherein the providing provides magnetic field energy to a frequency band including resonant frequencies of the mobile devices in the group.

3. The method according to claim 1 further comprising:
granting a charging order of priority to the mobile devices located in the charging region; and
providing energy to the mobile devices, according to the granted charging order of priority.

4. The method according to claim 3, wherein the charging order of priority is determined considering at least one of type, state of battery charge, remaining battery time and distance to the charging base station.

5. The method according to claim 1, wherein the selecting of the portion of the mobile devices located in the charging region as energy relays which relay magnetic field energy wirelessly comprises selecting a portion of the mobile devices as the energy relays, considering locations and states of battery charge of the mobile devices.

6. The method according to claim 1, further comprising:
determining, based on a movement trace of a mobile device of the mobile devices, whether to perform charging of the mobile device.

7. The method according to claim 1, wherein the providing is begun after a predetermined time delay from when a mobile device of the mobile devices enters the communication region outside the charging region.

8. A wireless charging system comprising:
mobile devices; and
a charging device which selects a portion of mobile devices located in a charging region as a group based on identification information transmitted from the mobile devices upon entering a communication region outside the charging region, determines to allow allocation of energy to the mobile devices in the group, determines to deny allocation of energy to other mobile devices not selected as belonging to the group, determines an allocation amount and provision time of energy to the mobile devices in the group based on the identification information, and provides energy intended to wirelessly charge the mobile devices in the group to the mobile devices in the group according to the determined allocation amount and provision time,
wherein the identification information comprises membership information to a predetermined group for which charging is allowed,
wherein the selecting comprises:
selecting a portion of the mobile devices as a first group; and
selecting another portion of the mobile devices as a second group,
wherein a portion of the mobile devices located in the charging region are energy relays which relay magnetic field energy wirelessly, and
wherein the providing provides energy intended to wirelessly charge the mobile devices in the first group and energy intended to wirelessly charge the mobile devices in the second group in a time division method.

* * * * *